US 009846750B2

(12) United States Patent
Moscatelli et al.

(10) Patent No.: US 9,846,750 B2
(45) Date of Patent: Dec. 19, 2017

(54) ADDING TILES TO A GRAPHICAL USER INTERFACE

(75) Inventors: Adriana Moscatelli, Seattle, WA (US); John SanGiovanni, Seattle, WA (US)

(73) Assignee: APPLE INC., Cupertino, CA (US)

( * ) Notice: Subject to any disclaimer, the term of this patent is extended or adjusted under 35 U.S.C. 154(b) by 2092 days.

(21) Appl. No.: 11/948,806

(22) Filed: Nov. 30, 2007

(65) Prior Publication Data

US 2009/0144376 A1   Jun. 4, 2009

(51) Int. Cl.
  *G06F 15/16*   (2006.01)
  *G06F 3/048*   (2013.01)
  *G06F 17/30*   (2006.01)

(52) U.S. Cl.
  CPC .. *G06F 17/30893* (2013.01); *G06F 17/30864* (2013.01)

(58) Field of Classification Search
  CPC .................. G06F 17/30893; G06F 17/30864
  USPC .......................................... 715/792; 709/206
  See application file for complete search history.

(56) References Cited

U.S. PATENT DOCUMENTS

| | | | |
|---|---|---|---|
| 5,712,995 A | 1/1998 | Cohn | |
| 6,466,237 B1 | 10/2002 | Miyao et al. | |
| 7,933,632 B2 * | 4/2011 | Flynt et al. | 455/569.1 |
| 2002/0083064 A1 * | 6/2002 | Davis et al. | 707/100 |
| 2003/0020671 A1 | 1/2003 | Santoro et al. | |
| 2004/0268413 A1 * | 12/2004 | Reid et al. | 725/131 |
| 2005/0283734 A1 * | 12/2005 | Santoro et al. | 715/765 |
| 2006/0085741 A1 | 4/2006 | Weiner et al. | |
| 2007/0082707 A1 * | 4/2007 | Flynt et al. | 455/564 |
| 2008/0181498 A1 * | 7/2008 | Swenson et al. | 382/173 |
| 2009/0031247 A1 * | 1/2009 | Walter et al. | 715/788 |
| 2009/0183083 A1 * | 7/2009 | Hedges | 715/738 |

OTHER PUBLICATIONS

International Search Report and Written Opinion issued for PCT/US2008/082982; dated Jan. 16, 2009; 10 Pages.

* cited by examiner

*Primary Examiner* — Kevin L Young
*Assistant Examiner* — Henry Orr
(74) *Attorney, Agent, or Firm* — Morgan, Lewis & Bockius LLP

(57) ABSTRACT

A software application having a graphical user interface (GUI) that displays content tiles along with the use of an electronic device to add tiles to the GUI is described in this disclosure. A predefined key on an input device is selected to indicate to display available tiles. One of the displayed available tiles is selected and the user designates a location on the display of the content tiles where to place the selected displayed available tiles. The selected tile is then inserted into the display with the plurality of tiles at the designated location and a tile previously at the designation location on the display is deleted and placed in a delete directory.

18 Claims, 4 Drawing Sheets

ADDING TILES TO A GRAPHICAL USER INTERFACE

BACKGROUND

Content is delivered to mobile communication devices from a many of sources over a wireless network. Traditionally the content may then be viewed on the device using a web browser. To obtain the content, a user is required to enter a web address into the mobile communication device. Once the user enters the web address, the mobile device sends a request to a service provider to obtain a web page. The web page is downloaded from the service provider and displayed with the web browser.

If the user wants to recall the web address, the user typically selects the web address from a favorite's directory stored within the web browser. When the user wants to add a new address to the favorite's directory, the user enters the address into the favorite's link within the web browser. The new address may be entered by selecting a script on the web page, by manually typing in the link or by selecting an add button within the browser or web page.

Adding a link to and retrieving a link from a web page in a favorite's directory on a mobile communications device may require multiple user interactions with the communications device. These interactions are time-consuming and diminish the user's experience.

SUMMARY

Use of a mobile communications device to add tiles to a graphical user interface (GUI) is described herein. The device includes a software application for adding tiles to a GUI. The GUI is displayed illustrating a grid of content tiles that indicate content stored on different web sites. A predefined key on an input device is selected to indicate to display available tiles not included with the content tiles available to be selected. In response to the selection of the predefined key, the available tiles are displayed. One of the displayed available tiles is selected, and the user designates a location on the display of the content tiles where to place the selected displayed tile. The selected tile is then inserted into the display within the grid of tiles at the designated location. A tile previously at the designation location on the display is deleted and placed into a deleted tiles directory.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

This disclosure is directed to using a mobile communications device to add tiles to a graphical user interface. A software application displays, with an electronic device, a grid of content tiles that indicate content stored on different web sites. The user selects a predefined key on an input device to indicate to display available tiles, not displayed in the grid, to be selected. In response to selection of the predefined key, the available tiles are displayed. The user then selects one of the displayed available tiles and designates a location on the grid of the content tiles where to place the selected tile. The selected tile is then inserted into the grid at the designated location and a tile previously at the designation location in the grid is deleted and placed into a delete directory.

These techniques help provide a mechanism for replacing tiles on a grid of content tiles shown on the display of a networked electronic device in an easy manner while allowing the user to recall the replaced tiles. The techniques may be provided by any content server, and the content may be received by, installed, and activated on any networked electronic device such as a computer, PDA, computer laptop or cell phone, or smart phone. Various examples of adding tiles to an electronic device, such as a mobile communication device are described below with reference to FIGS. 1-4.

Example System Architecture

Figure 1:
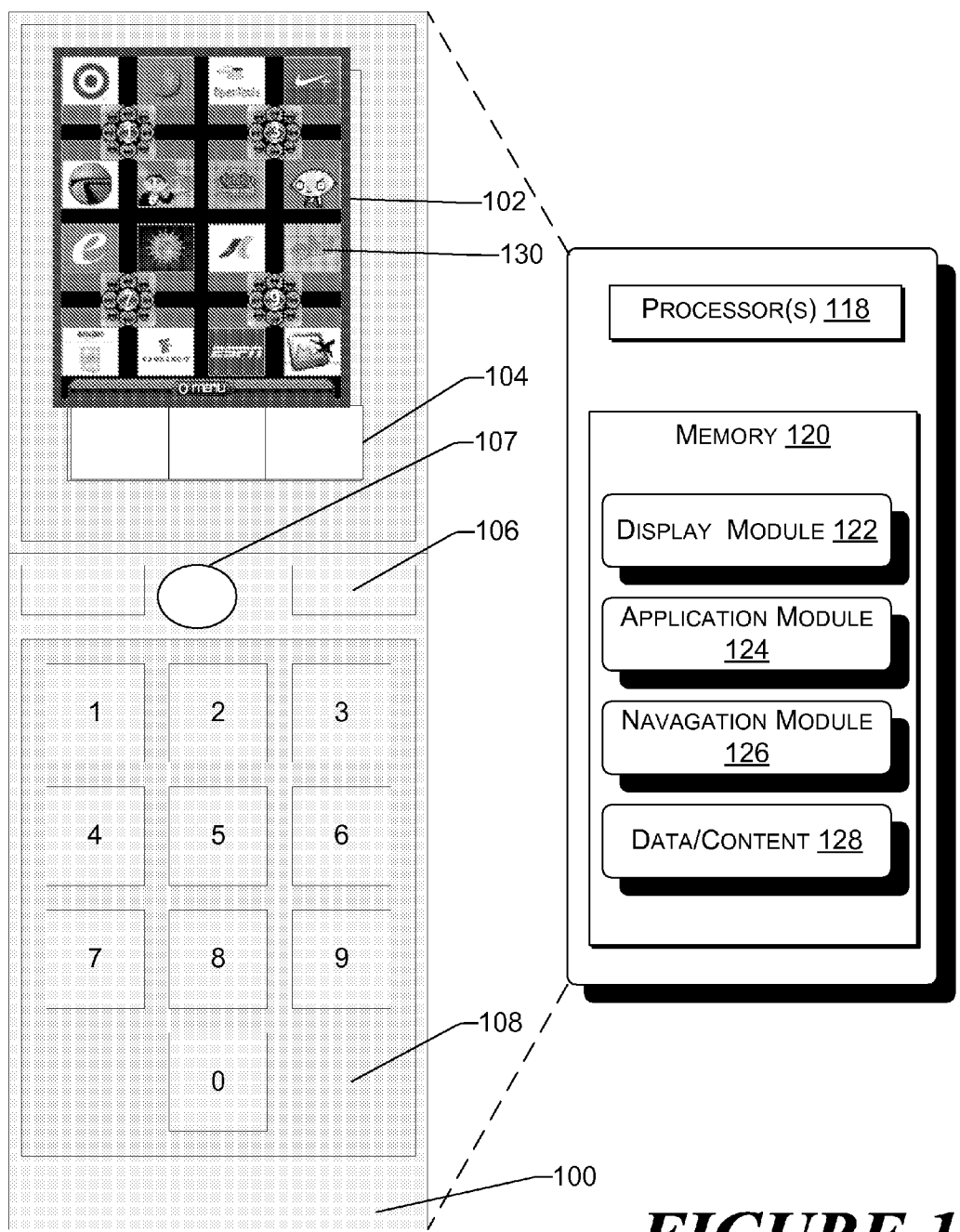
FIG. 1 illustrates an exemplary mobile communication device.

FIG. 1 illustrates an electronic device, for example, a networked mobile communications device 100 in which elements on display 102 may be invoked using soft key 104, keyboard key 106, arrow key 107 or keys on keypad 108. Mobile communications device 100 may include a processor 118 and memory 120. Memory 120 may be a magnetic disk non-volatile optical disk, ROM and/or RAM. Stored within memory 120, by way of example, are display module 122, application module 124, navigation module 126 and data/content 128. Shown on display 102 are many tiles 130 in a grid format. Tiles 130 correspond to applications or data stored in memory 120 or on many different content servers.

Similar resources may use the communications device and the processes as described herein. The communications device 100 is only one example of a computer environment and is not intended to suggest any limitation as to the scope of use or functionality of the computer and network architectures. Neither should the communications device 100 be interpreted as having any dependency or requirement relating to any one or combination of components illustrated in the exemplary communications device 100.

The communications device includes a general-purpose computing device in the form of a client device (also referred to as a networked device) 100. The communications device 100 can be, for example, one or more of a stand alone computer, laptop computer, a networked computer, a mainframe computer, a PDA, a telephone, a microcomputer or microprocessor, or any other computer device that uses a processor in combination with a memory. The components of the communications device 100 can include, but are not limited to, one or more processors or processing units 118 (also herein referred to as processor 118), a system memory 120, network interface and a system bus (not shown) that couples various system components including the processor 118, network interface and the system memory 120.

The memory 120 can comprise a variety of computer readable media. Such media may be any available media that is accessible by the communications device 100 and includes both volatile and non-volatile media, and removable and non-removable media. The process for activating instructions can be stored as instructions sets on the computer readable media.

The system memory 120 may include the computer readable media in the form of non-volatile memory such as read only memory (ROM) and/or volatile memory such as random access memory (RAM).

A user can enter commands and information into the communications device 100 via input devices such as a microphone, cursor controller keyboard 108 and/or a pointing device (e.g., a "mouse") which send a signal to the processor 118 in response to commands from the user. Other input devices (not shown specifically) may include a joystick, game pad, satellite dish, serial port, scanner, and/or the like. These and other input devices are connected to the processor 118 via input/output interfaces (not shown) that are coupled to the system bus of communications device 100, but may be connected by other interface and bus structures, such as a parallel port, game port, or a universal serial bus (USB).

An LCD monitor, flat panel displays, touch screen displays, or other type of display 102 can also be connected to the system bus via a video interface (not shown), such as a video adapter. In addition to the displays 102, other output peripheral devices can include components such as speakers (not shown) which can be connected to the communications device 100.

Various modules and techniques may be described herein in the general context of the computer-executable instructions, such as program modules, executed by one or more computers or other devices. Generally, program modules include routines, programs, control objects, components, control node data structures, etc. that perform particular tasks or implement particular abstract data types. Often, the functionality of the program modules may be combined or distributed as desired in various embodiments.

Display module 122 may display content on screen or display 102 in accordance with commands provided by application module 124. Application module 124 generates a Graphical User Interface (GUI) and receives content/data from a server over a network, such as the internet. Application module 124 may include other applications that can be launched in response to a user activating applications shown on display 102. Navigation module 126 enables the user to move between the different tiles 130 shown on screen using a process, such as the process described in co-pending U.S. patent application Ser. No. 11/061,218, filed Feb. 18, 2005, which is hereby incorporated by reference.

Data/Content 128 may be stored in memory 120 and may be provided from a service provider. Data/content 128 may be received content/data that can be displayed on device 100 and may include advertisement sponsored content. Content 128 may include, for example, sponsor provided content or non-sponsor content.

Figure 2:
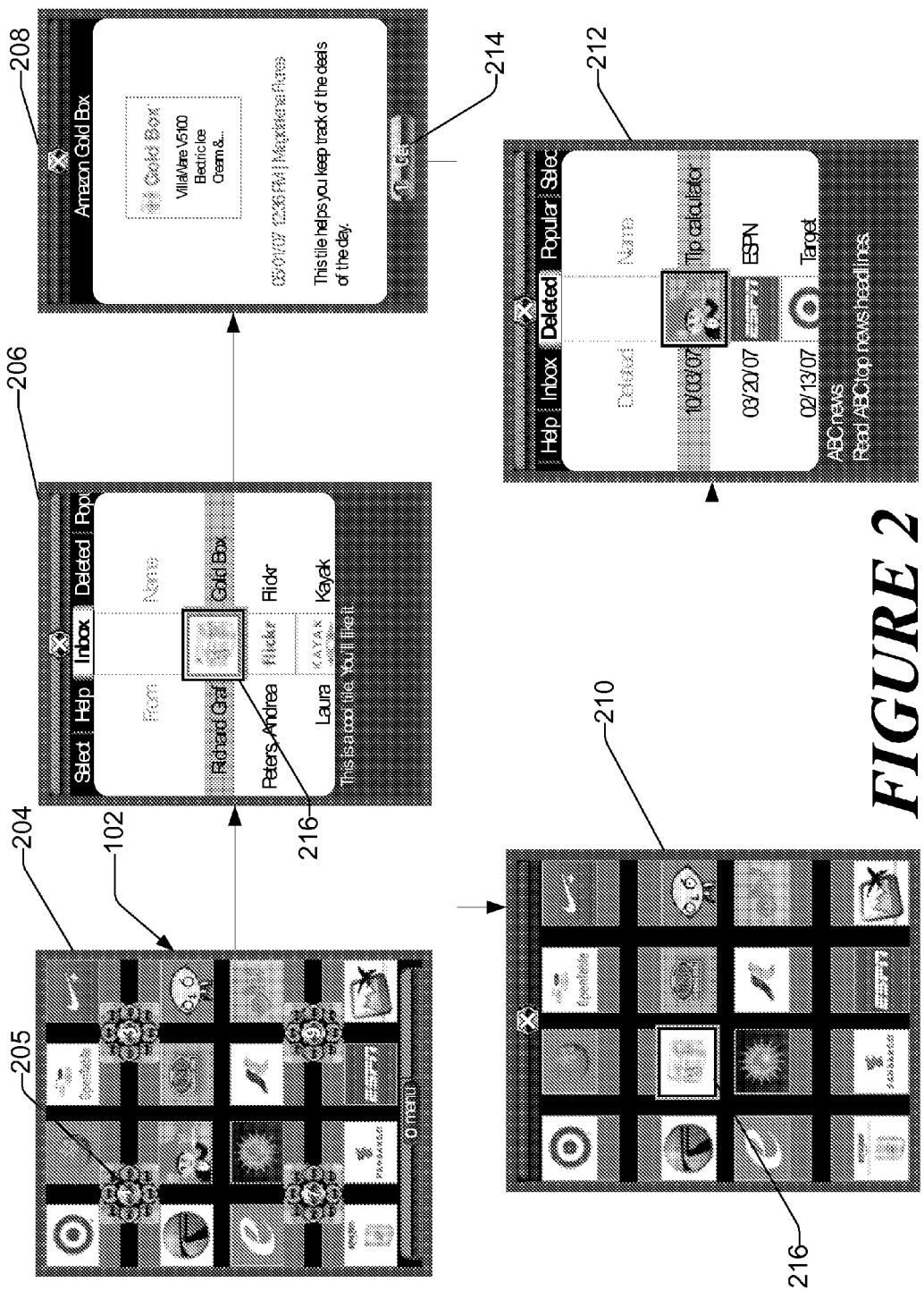
FIG. 2 illustrates five different screen displays on a mobile communications device that may be used for adding tiles to a graphic user interface display.

Shown in FIG. 2 is display 102 having exemplary multiple on-screen screens 204-212. Screens 204-212 are shown in sequence demonstrating the addition and deletion of tiles to the display 102. Such screens 204-212 may all be simultaneously cached in memory of the mobile communications device.

The communications device 100 may have content/data in a tile format. The tiles may be pre-installed on the device 100 or may be received from various sources, including third parties (via e-mail or multimedia messaging systems) or a content server. Such tiles may be downloaded or be passed to device 100 using HTTP protocols or e-mail messaging systems.

After content/data is initially received in a tile format, the tiles may be instantiated on a display 102 in the format of a grid of tiles shown in screen 204. Functions on the screen may be assigned to an adjacent software assignment key (soft key) that can be selected by a user. For some communications devices, the functions may be selected by depressing the function label on the display 102, using the arrow key or using other keys on device 100. Additionally or alternatively the functions shown on the display 102 may be indicate a number identical to a number on a keypad of the mobile communication device 100.

When the soft key or number on the keypad is depressed as shown in screen 204, a function or application depicted in a tile is invoked. Also when the soft key or number on the keypad 108 is invoked on screen 204, another screen 206 may be instantiated to automatically launch an application. In one example, a predefined key, e.g. a zero key, a zero location on a menu 205 on screen 204 may be selected. Upon invoking the zero key, tiles available to be added to display may be shown in an inbox directory as illustrated on screen 206. These available tiles may be stored in memory as a result of, for example, being retrieved from an e-mail, from multimedia messaging systems or from previous downloading from a server. Exemplary available tiles are shown on screen 206.

A user then using an action/soft key selects one of the tiles, e.g. tile 216. The selected tile is then shown on screen 208. In one embodiment, content related to the tile 216 may be downloaded from a content server and displayed with the selected tile in screen 208. The user may then select the tile on the screen or select an action key, such as "Get" key 214 to confirm that the user desires to place the selected tile 216 on the grid in the display 102 with the other tiles. Selection of the action key then results in screen 210 being displayed with a list of locations to place the selected tile 216. The user then chooses allocation to place the tile 216 by using arrows 107 on keypad, or by depressing the location on a touch screen display. Once the location is selected, the selected tile 216 is moved to the selected location on screen 210, and the tile that was previously in that location is automatically moved to a delete directory shown in screen 212. From the deleted directory the removed tile may be recalled or added to the inbox directory for replacement on display 102.

Figure 3:
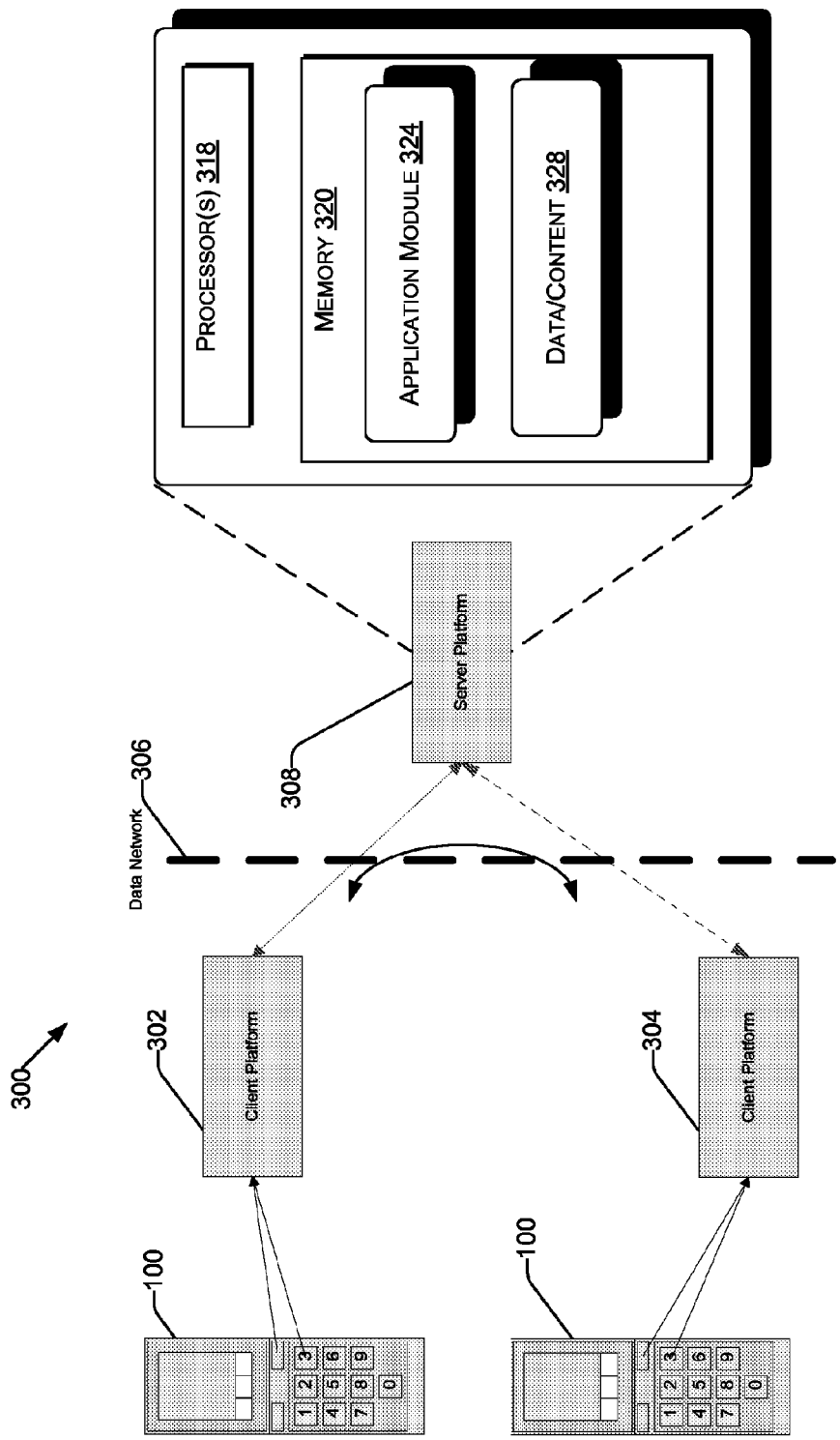
FIG. 3 illustrates a simplified block diagram of a system in which the exemplary mobile communications device may transmit and receive tiles to other client platforms, and receive both tiles and content from a server.

Shown in FIG. 3 is a system 300 having communications devices 100a and 100b with a client platform applications 304 and client platform applications 304 respectively, coupled via data network 306 to server platform 308. Client platforms 302 and 304 may transmit and receive tiles via network 306 from each other. Client platforms 302 and 304 may also receive tiles and content related to the tiles from server platform 308. Although server platform 308 is shown, server platform may be a collection of many servers at one location or at many locations. When the client platform 304 request content from the server platform 308, content from the platform 308 may be downloaded to the client platform 304 and be stored locally in memory 120 of the mobile communications device 100.

The communications devices 100a and 100b can operate in a networked environment using logical connections to one or more remote computers (also referred to herein as a server platform 308). By way of example, the platform 308 can be a personal computer, portable computer, one or more servers, a router, a network computer, a peer device or other common network node, game console, and the like. The remote computer 308 can be a server that can include many or all of the elements and features described herein relative to the communications devices 100a and 100b.

For example, the components of the server 308 can include, but are not limited to, one or more processors or processing units 318 (also herein referred to as server processor 318), a system memory 320, network interface (not shown) and a system bus (not shown) that couples various system components including the processor 318, network interface and the system memory 320. Stored in system memory 320, including by way of example, may be an operating system (OS), web and data content 328 (including applications to deliver the web content) to be provided to display 102 and applications 124 (e.g. web content and tiles) in client platform 302 or 304.

Logical connections between the communications devices 100a and 100b and the sever platform 308 (e.g. a service provider) are depicted as a network 306 an Internet (or Intranet) which may include a local area network (LAN) and/or a general wide area network (WAN). Application 124 (FIG. 1) may be initially stored in application module 324 on the server platform 308 and may be downloaded via the network 306 onto memory 120 in communications device 100. Client platform 302 may communicate to the other client platforms 304 using any communications media via network 306.

Application module 324 generates a tile using content/data 328. Module feeds the tiles to the client platforms 302 and 304 via network 306. One exemplary network 306 includes the internet. Application module 324 may include other applications that can be launched in response to receiving commands from client platforms 302 and 304. Such applications may provide video, information, audio and multimedia messaging to client platforms and may be retrieved from other server platforms (not shown)

Users of the communications device 100 enter commands by selecting functions, which are processed by client platform application 302 or 304. In response to some commands, client platform application 302 sends requests to server platform 308. Platform 308 responds to the requests by delivering data/content to client platform 302 or providing an indication to a third party server to deliver content or tiles to platform 308, so that such tiles may be delivered to client platform 302 or 304.

Exemplary Process

Figure 4:
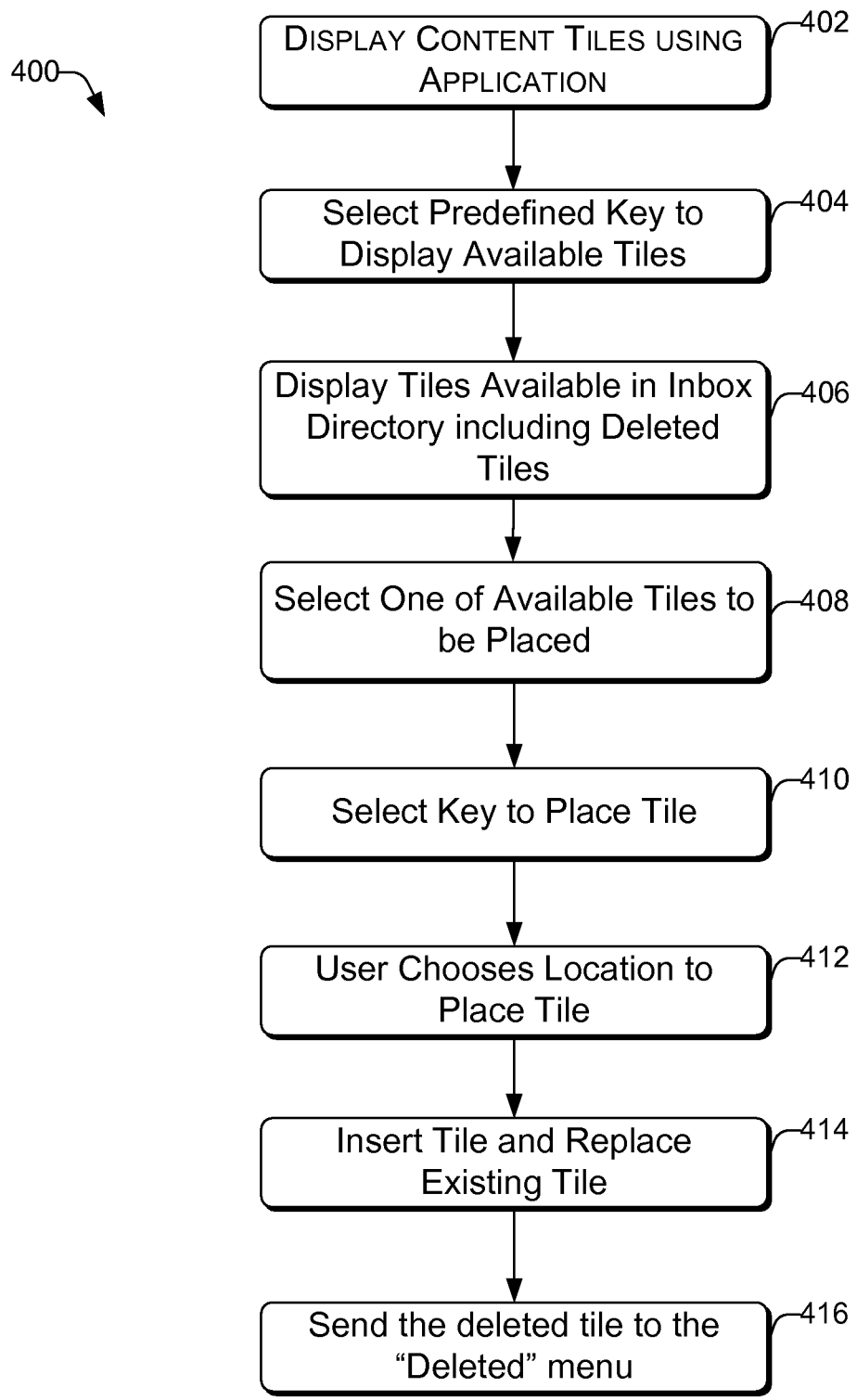
FIG. 4 illustrates a logical flow diagram illustrating an exemplary process for adding tiles to a graphic user interface display.

FIG. 4 shows a flow diagram of a process 400 used to add or delete tiles on an electronic device, such as a mobile communication device 100. Exemplary process 400, shown in FIG. 4, is illustrated as a collection of blocks in a logical flow diagram. The flow diagram depicts exemplary blocks 402-416 used by processor 118 in device 100 (see FIG. 1), to enable the addition and replacement of content tiles. Blocks 402-416 represent a sequence of operations that can be implemented in hardware, software, and a combination thereof. Implementing these blocks results in the displays, illustrated in FIG. 4, to be shown on device 100. These displays will be described along with the description of blocks 402-416 herein.

In the context of software, the blocks 402-416 represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes are described with reference to device 100 of FIG. 1, although it may be implemented in other system architectures. Although insertion of one tile is being described, many more tiles may be selected and added.

In this process 400, a web browser or other GUI application that is installed as application module 124 on the communication device 100 displays content tiles in a grid form on display 102 at block 402. Such content is provided from server as previously described.

At block 404, a predefined key is selected to display available tiles that can be placed on the tiles in grid form. In one embodiment, the predefined key may be a zero key on a communications device, may be a zero menu key on a touch screen display or may be a zero menu/softkey button on the display or keyboard of a communications device. Selecting the key may recall a directory containing tiles available to be added.

At block 406, the tiles in an inbox directory and available to be added, including any deleted tiles, may be displayed in response to the zero menu key being selected. At block 408, one of the available tiles in the inbox directory to be placed on the grid is selected. Such selection may occur by the user pressing an action or soft key on the communications device 102, or by the user actually selecting the desired tile shown on a display of a touch screen.

At block 410 a key is then selected to place the tile into the grid. Such key may be selected by pressing an action key, by pressing another predefined key such as the #1 key, and/or by pressing a predefined softkey displayed on a touch screen, e.g. a "Get" button.

At block 412, in response to the key being selected to place the tile, the grid with all the tiles appears. The user then chooses the location on the grid to place the selected tile. Such location may be selected by the user using arrows 107 on the communications device 102 or by the user selecting the action location on the touch screen. In one implementation the tile could be added to a default location on the grid.

At block 414, the selected tile is then inserted on the grid at the selected location to replace the tile that is at the selected location. At block 416, the deleted tile is moved to a cache area in memory, such as a deleted directory. The process may then be repeated at block 402 by redisplaying the content tiles with the selected tile at its new location on the grid.

Conclusion

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method for adding tiles to a graphical user interface display comprising:
    displaying with an application having a graphical user interface (GUI) a plurality of content tiles in a grid format, the plurality of content files corresponding to content stored on a plurality of different web sites;
    selecting a predefined key on an input device to indicate and to display available tiles not included within the grid of content tiles;
    in response to selection of the predefined key, displaying the available tiles;
    selecting one of the displayed available tiles;

designating a location on the display of the plurality of content tiles where to place the selected one of the displayed available tiles;
  inserting the selected tile into the display with the plurality of tiles at the designated location; and
  upon the selected tile being placed at the designated location, deleting a tile previously at the designated location on the display and placing the deleted tile into a delete directory.

2. The method as recited in claim 1 further comprising receiving the tiles from a third party via one of either electronic mail or using a multimedia messaging system.

3. The method as recited in claim 1 wherein selecting said predefined key automatically adds a tile to the display.

4. The method as recited in claim 3 wherein the tile is automatically added to a default location on the display.

5. The method as recited in claim 1 wherein one of the displayed available tiles is selected by either depressing a zero key on a communications device, depressing a 0 menu button on the display or by selecting a zero menu from a drop down menu on the display.

6. The method as recited in claim 1 wherein a location on the display of the plurality of content tiles where to place the selected one of the displayed available tiles is designated by either selecting arrows on a keypad or selecting a location on the display.

7. The method as recited in claim 1 further comprising making tiles in the delete directory available for replacement on the display with the plurality of tiles.

8. The method as recited in claim 7 further comprising adding the deleted tile to an inbox directory indicating the list of available tiles to be selected.

9. A non-transitory computer readable storage medium comprising computer-executable instructions that, when executed by one or more processors, perform acts comprising:
  displaying a plurality of content tiles that indicate content stored on a plurality of different web sites;
  receiving a selection of a predefined key on an input device to indicate and to display available tiles not included with the plurality of content tiles available to be selected;
  in response to selection of the predefined key, displaying the available tiles; receiving a selection of one of the displayed available tiles;
  receiving a designation of a location on the display of the plurality of content tiles where to place the selected one of the displayed available tiles;
  inserting the selected tile into the display with the plurality of tiles at the designated location; and
  upon the selected tile being inserted at the designated location, deleting a tile previously at the designated location on the display and placing the deleted tile into a deleted directory.

10. The non-transitory computer readable storage medium as recited in claim 9 wherein one of the displayed available tiles is selected by either depressing a zero key on the input device, depressing a 0 menu button on the display or by selecting a zero menu from a drop down menu on the display.

11. The non-transitory computer readable storage medium as recited in claim 9 wherein a location on the display of the plurality of content tiles where to place the selected one of the displayed available tiles is designated by either selecting arrows on a keypad or selecting a location on the display.

12. The non-transitory computer readable storage medium as recited in claim 9 wherein the acts further comprise making tiles in the deleted directory available for replacement on the display with the plurality of tiles by moving the tiles to an inbox directory.

13. The non-transitory computer readable storage medium as recited in claim 12 wherein the acts further comprise adding the removed tile to the list of available tiles to be selected.

14. A system comprising:
  an input device;
  a mobile communications device coupled with the input device operable for displaying a plurality of content tiles that indicate content stored on a plurality of different web sites stored on accessible via a service provider, said device operable for receiving a selection of a predefined key on the input device for displaying available tiles not included with the plurality of content tiles available to be selected;
  the service provider operable for providing content to the mobile communications device when tiles are selected on the mobile communication device; and
  said mobile communications device in response to selection of the predefined key, operable to display the available tiles, to receive a selection of one of the displayed available tiles from the input device, said device to receive a designation of a location on the display of the plurality of content tiles where to place the selected one of the displayed available tiles, to insert the selected tile into the display with the plurality of tiles at the designated location, and upon the selected tile being inserted at the designated location, to delete a tile previously at the designated location on the display and to place the deleted tile into a delete directory in memory of the device.

15. The system as recited in claim 14, wherein the mobile communications device is further operable to receive the tiles from the service provider via one either electronic mail or using a multimedia messaging system and place the received tiles on receipt into an inbox directory on the mobile communications device.

16. The system as recited in claim 14 wherein the device automatically adds a tile to a default location on the display.

17. The system as recited in claim 14 wherein the display of the plurality of content tiles is in a grid format, and wherein said device is operative to receive an indication from the input device the designated location on the display of where to place the selected one of the displayed available tiles by the input device indicating a selection of the location on the grid, and wherein the device is operative to place the selected one of the available tiles on the grid at the designated location.

18. A method for adding tiles to a graphical user interface display, said method comprising:
  displaying with an application having a graphical user interface (GUI) a plurality of content tiles in a grid format, the plurality of content tiles corresponding to content stored on a plurality of different web sites;
  selecting a predefined key on an input device to indicate and to display available tiles not included within the grid of content tiles;
  in response to selection of the predefined key, displaying the available tiles;
  selecting one of the displayed available tiles;
  designating a location, on the display of the plurality of content tiles, where to place the selected one of the displayed available tiles, wherein said location is occupied by a content tile of said plurality of content tiles;

in response to the designation of the location, moving the selected tile to the designated location and automatically moving the content tile from the designated location to a delete directory.

* * * * *

UNITED STATES PATENT AND TRADEMARK OFFICE
CERTIFICATE OF CORRECTION

PATENT NO. : 9,846,750 B2
APPLICATION NO. : 11/948806
DATED : December 19, 2017
INVENTOR(S) : Moscatelli et al.

It is certified that error appears in the above-identified patent and that said Letters Patent is hereby corrected as shown below:

In the Claims

Claim 1, Column 6, Line 59, please delete "content files corresponding" and insert --content tiles corresponding--;

Claim 14, Column 8, Line 13, please delete "sites stored on accessible" and insert --sites accessible--.

Signed and Sealed this
Twenty-fourth Day of April, 2018

Andrei Iancu
*Director of the United States Patent and Trademark Office*